(12) United States Patent
Yoshida

(10) Patent No.: US 9,436,482 B2
(45) Date of Patent: Sep. 6, 2016

(54) INPUT CONTENT TO APPLICATION VIA WEB BROWSER

(75) Inventor: Kotaro Yoshida, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 1388 days.

(21) Appl. No.: 12/410,470

(22) Filed: Mar. 25, 2009

(65) Prior Publication Data
US 2010/0251084 A1 Sep. 30, 2010

(51) Int. Cl.
G06F 15/16 (2006.01)
G06F 9/44 (2006.01)

(52) U.S. Cl.
CPC .................. *G06F 9/4443* (2013.01)

(58) Field of Classification Search
CPC .................................... G06F 9/4443
USPC ......................................... 709/203
See application file for complete search history.

(56) References Cited

U.S. PATENT DOCUMENTS

| | | | | |
|---|---|---|---|---|
| 6,119,166 A * | 9/2000 | Bergman et al. | ............. | 709/232 |
| 6,151,609 A | 11/2000 | Truong | | |
| 7,290,029 B2 | 10/2007 | Tang et al. | | |
| 7,451,176 B2 * | 11/2008 | Anders et al. | ................ | 709/201 |
| 7,966,599 B1 * | 6/2011 | Malasky et al. | ............... | 717/100 |
| 2004/0003054 A1 * | 1/2004 | Becker et al. | ................ | 709/219 |
| 2006/0184352 A1 | 8/2006 | Chen et al. | | |
| 2007/0240098 A1 * | 10/2007 | Averett et al. | ................ | 717/104 |
| 2007/0245353 A1 * | 10/2007 | Ben-Dor | ........................ | 719/318 |
| 2007/0300217 A1 * | 12/2007 | Tunmer et al. | ................ | 717/177 |
| 2008/0263230 A1 * | 10/2008 | Mizuno et al. | .................... | 710/8 |
| 2009/0070765 A1 | 3/2009 | Alves et al. | | |
| 2010/0125859 A1 * | 5/2010 | Bishop | ......................... | 719/329 |

FOREIGN PATENT DOCUMENTS

| | | |
|---|---|---|
| JP | 2007080063 A | 3/2007 |
| KR | 1020040426315 B1 | 4/2004 |
| KR | 1020060080132 A | 7/2006 |
| KR | 1020070109149 A | 11/2007 |

OTHER PUBLICATIONS

Berners-Lee, T. RFC 2396. Uniform Resource Identifiers (URI): Generic Syntax. Aug. 1998. pp. 1-40.*
"typd.in Lets You Type in Japanese on the Web", retrieved at <<http://typd.in/>>, Jan. 28, 2009, pp. 1-2.

(Continued)

*Primary Examiner* — John MacIlwinen
(74) *Attorney, Agent, or Firm* — Damon Rieth; Aaron Hoff; Micky Minhas

(57) ABSTRACT

The disclosed architecture allows markup language (e.g., HTML) pages to facilitate the insertion of content (e.g., text) into an application to which an input method is attached. In this way, a plug-in developer can implement any UI look and behavior using a web page language (e.g., HTML), communicate with a backend datasource just as a regular HTML page, and perform this using any suitable technology. Since the web page is stored in a web server and downloaded to client on-the-fly, install is minimal and users can use the latest version automatically. A broker component receives data derived from code authored in the programming language and embedded in a markup language and provides the additional arbitrary data to the application.

16 Claims, 9 Drawing Sheets

(56) References Cited

OTHER PUBLICATIONS

Yong, et al., "Java Input Method Engine", Proceedings of the seventh international conference on World Wide Web 7, retrieved at <<http://www7.scu.edu.au/1915/com1915.htm>>, Jan. 28, 2009, pp. 1-10.
"Silverlight: Using Input Method Editors for Text Entry in Silverlight", retrieved at <<http://www.bestechvideos.com/2007/06/27/silverlight-using-input-method-editors-for-text-entry-in-silverlight>>, Jun. 27, 2007, pp. 1-4.
Lau, Angus, "Ajaxime—An Online Input Method Editor", retrieved at <<http://www.852signal.com/2007/07/16/ajaxime-an-online-input-method-editor/>>, Jul. 16, 2007, pp. 1-4.
Sastry, Surekha, "A Javascript Indic Input Method Editor", retrieved at <<http://foss.in/2005/schedules/talkdetails.php?talkcode=D1245043>>, Nov. 29-Dec. 2, 2005, pp. 1-2.
"InputKing Online Chinese Input System", retrieved at <<http://www.inputking.com/EN/index.php>>, Jan. 28, 2009, p. 1.
"International Search Report", Mailed Date: Nov. 1, 2010, Application No. PCT/US2010/028028, Filed Date: Mar. 19, 2010, pp. 8.
"Notice of Allowance Received in Chinese Patent Application No. 201080014045.4", Mailed Date: Sep. 23, 2013, Filed Date: Mar. 19, 2010, 4 Pages.
"Notice of Rejection Received in Japanese Patent Application No. 2012-502131", Mailed Date: Feb. 19, 2014, Filed Date: Mar. 19, 2010, 9 pages.
Sueyasu, Taizo, "Dramatic Improvement in Japanese Input: How to Use the Most Powerful Combination of "SCIM" and "Anthy"", Nikkei Linux, Nikkei Business Publications, Inc., May 8, 2006, vol. 8, Issue 5, pp. 43-47 (w/o English transaction).
Tejima, Toru, "Rich Client has the Advantages of Both Web and C/S: Easy to Use, Easy to Manage", Nikkei Systems, Nikkei Business Publications, Inc., Nov. 26, 2007, Issue 176, pp. 108-113 (w/o English transaction).
Nakajo, Tatsuo, "Learn by Professionals: Key to Success in Developing Web Applications—Fully Utilizing Apache, PHP, and My SQL", Nikkei Software, Nikkei Business Publications, Inc., Feb. 24, 2004, vol. 7, Issue 3, pp. 116-125 (w/o English transaction).
Kato, Etsushi, "Use Unim Related Systems", Software Design, Gijutsu Hyohron Co. Ltd., Mar. 18, 2007, Issue 197, pp. 50-57 (w/o English transaction).
"Office Action Received for Japanese Application No. 2012-502131", Mailed Date: Sep. 1, 2014, 7 Pages.
Shimoda, Hiroshi, "You Can Change/Add Functions. Let's Develop Firefox Extensions, Part 1: Learn What Firefox Extensions Are", Nikkei Linux, Nikkei Business Publications, Inc., vol. 8, Issue 7, Feb. 24, 2004, pp. 92-102. (w/o English transaction).
"Office Action and Search Report Received for Taiwan Patent Application No. 99103386", Mailed Date: Jan. 5, 2015, 12 Pages.
"Office Action Issued in Korean Patent Application No. 10-2011-7022370", Mailed Date: Dec. 11, 2015, 6 Pages. (W/o English Translation).
Popov, et al., "An Efficient Incremental Marshaling Framework for Distributed Systems", In Journal Future Generation computer Systems—Special issue: Parallel Computing Technologies, vol. 21, Issue 5, May 1, 2005, pp. 717-724.
Notice of Allowance Issued in Korean Patent Application No. 10-2011-7022370, Mailed Date: Jun. 30, 2016, 2 Pages (W/o English Translation).

\* cited by examiner

INPUT CONTENT TO APPLICATION VIA WEB BROWSER

BACKGROUND

Third party programs request input methods to have plug-in capability so that the input method can add third-party components into the input system to extend input experience in specific scenarios. This further facilitates extensibility for adding more input features as services after shipping the input method core binaries. Such plug-in components need to have a user interface (UI) look and behavior for communications with backend datasources, which can be in a local computer or at a remote server. Additionally, these plug-in components need to be downloaded and easily installable and updated appropriately when new versions become available.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture allows markup language pages (e.g., HTML) to facilitate the insertion of content (e.g., text) to an application which the input method is attached. In this way, the plug-in developer can implement any user interface (UI) look and behavior using web page language (e.g., HTML), and communicate with a backend datasource just as a regular web page can do using suitable technologies. Since the web page is stored in a web server and downloaded to client browser on-the-fly, install is minimal and users can use the latest version automatically.

In one implementation, a broker component is implemented that receives instructions from code embedded in HTML of the web page. A client browser (or other suitable application for processing the web page) receives the web page, runs code (e.g., scripts such as javascript) embedded in the HTML. Thus, the broker component can be invoked from the code in the HTML page by a URL protocol handler mechanism. Additionally, the broker component can be installed natively as part of the client system.

For example, consider that the plug-in developer wants to implement an input method plug-in component to add software keyboard features to the input method and/or associated application. The developer can author an HTML page with code to show key buttons ranging from 'a' to 'z'. When a user opens the HTML page and selects a button on the page, the corresponding character is inserted into the application running in the client computer. Since it is an HTML page, the developers can layout buttons arbitrarily with the desired cosmetics. Subsequently, when choosing to add more features to the plug-in (e.g., adding more buttons to insert words, rather than characters), the developer simply updates the HTML page at the web server. The user will receive the new version (updates) automatically via the client browser, for example.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
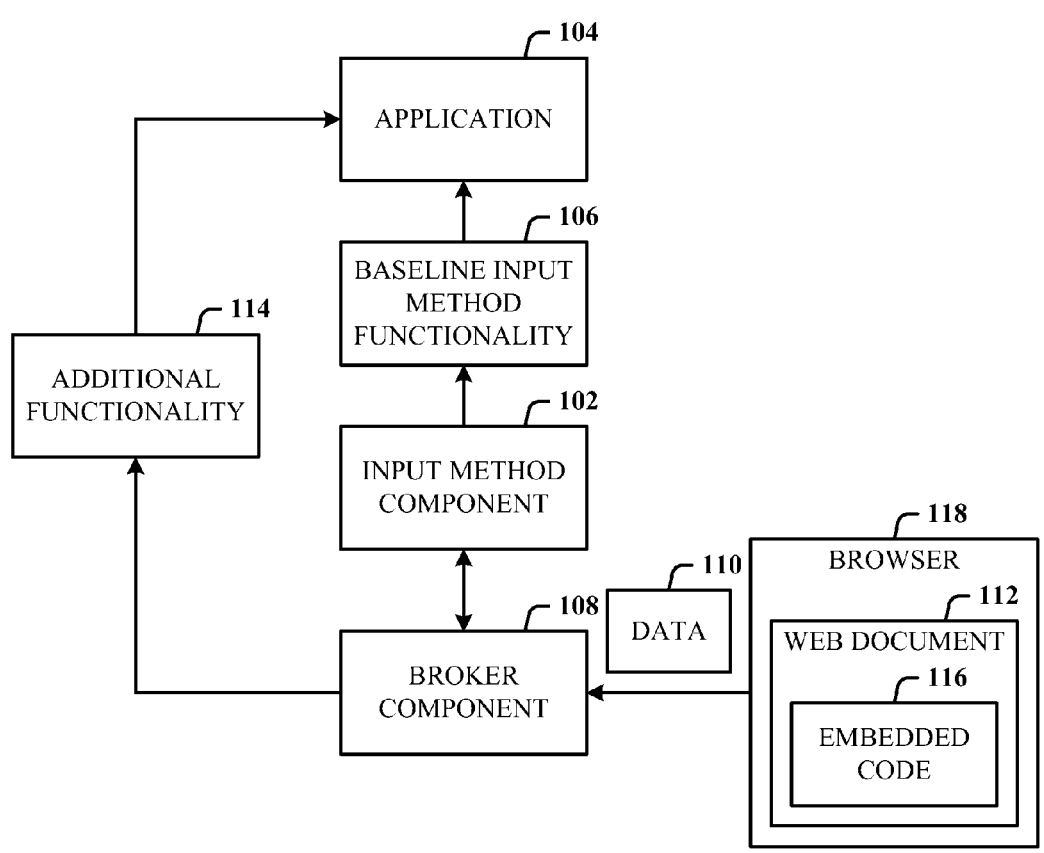
FIG. 1 illustrates a computer-implemented content system in accordance with the disclosed architecture.

The disclosed architecture allows markup language pages (e.g., HTML) to facilitate the insertion of content (e.g., text strings, objects, audio, video, etc.) into an application which an input method is attached. In this way, a plug-in developer can implement any UI (user interface) look and behavior using a web page language (e.g., HTML), communicate with a backend datasource as a regular HTML page can, and accomplish this using suitable technologies. Since the web page is stored in a web server and downloaded to the client on-the-fly, install is minimal and users can obtain the latest version easily and automatically.

A broker component is implemented on the client and receives data resulting from execution of code embedded in the markup language of the web page. By adding additional broker components to the client system, more data types can be accommodated on the client system for corresponding client applications.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented content system 100 in accordance with the disclosed architecture. The system 100 includes an input method component 102 attached to an application 104 for providing baseline input method functionality 106 to the application 104, and a broker component 108 for receiving data 110 of a web document 112 that results in the adding of additional functionality 114 (e.g., input method functionality) as provided by the data 110, the additional functionality 114 indirectly provided to the application 104 via processing of the embedded code 116 in the web document 112.

The web document 112 can be a web page that includes the embedded code 116 that when executed generates the data 110. The embedded code 116 can be authored any suitable programming language (e.g., a scripting language) and embedded in a markup language such as HTML. The web document 112 can be stored on a web server and downloaded to a client browser 118 that processes or causes processing of the embedded code 116 to generate the data 110, and hence, the additional input method functionality 114.

Generally, the web document 112 facilitates the automatic supplementation of the additional functionality 114 (as the data 110) for the application 104 based on user interaction with the web document 112. The product (e.g., text, image, etc.) of the additional functionality 114 is then provided to the application 104. The broker component 108 can be invoked from the web document 112 using a URL (uniform resource locator) protocol handler mechanism. The additional functionality 114 includes at least one of text or complex objects such as images, audio, and/or video, for example.

Put another way, the computer-implemented content 100 system comprises the input method component 102 associated with the application 104 for providing the baseline input method functionality 106 to the application 104, and the broker component 108 associated with the input method component 102 for receiving a notification from the input method component 102, the broker component 108 providing the additional functionality 114 to the application 104 in the form of data generated from the code 116 in the web page (e.g., the web document 112).

Figure 2:
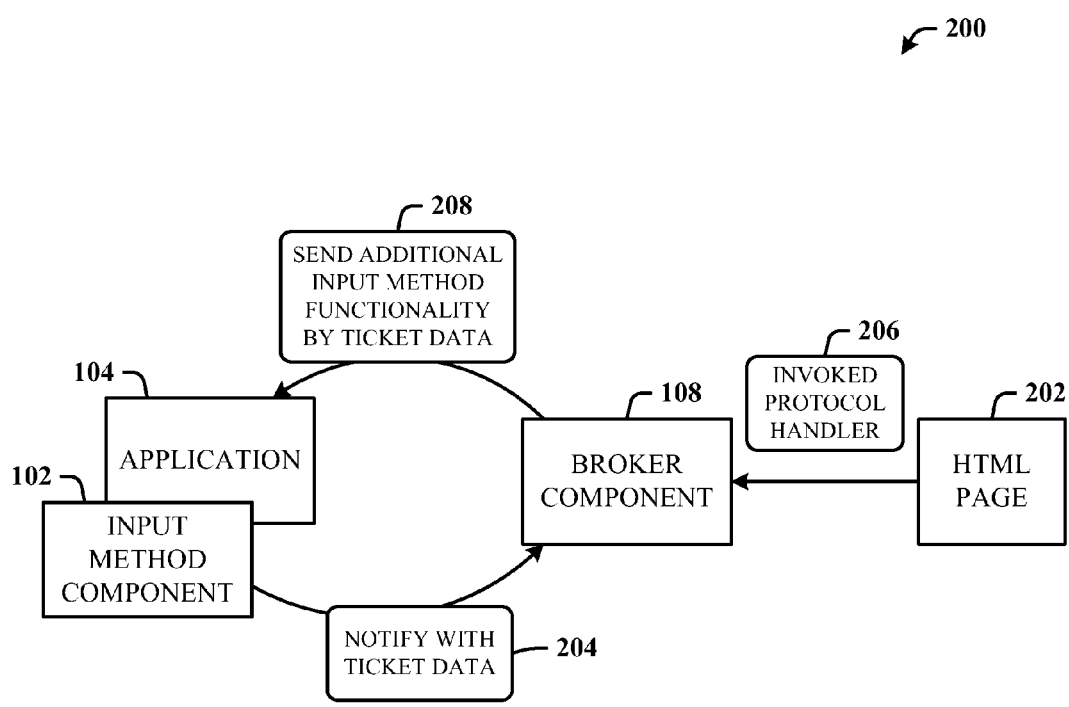
FIG. 2 illustrates a flow diagram of communications between components and entities that facilitate content input via a web document.

The broker component 108 receives the data 110 from the browser that processes the code in the web page. The additional functionality 114 is generated from the data 110 when the browser 118 runs the code 116 in the web page that calls the broker component 108. The broker component 108 receives an identifier associated with the input method component 102. The broker component 108 registers the identifier and routes the data 110 based on the registered identifier. The broker component 108 facilitates utilization of the data 110 of a specific data type. Additionally, the broker component 108 facilitates entry of the data 110 into the application 104 in a form of at least one of a character, a word, a phrase, or complex object, which application 104 is a linguistics application FIG. 2 illustrates a flow diagram 200 of communications between components and entities that facilitate content input via a web document. The application 104 can be a program running on a client computer, with the input method component 102 attached to the application 104. The broker component 108 can be native code installed and running on the client computer. The diagram 200 shows that in this example, the web document is an HTML page 202, which can be created by a plug-in developer. The HTML page 202 includes the embedded code 116 of FIG. 1 written in a scripting language, for example, such that when the browser runs the code 116, the resulting data forms the additional input method functionality provided by the input method component 102 to the application 104. Note that other technologies can be employed to write the program code embedded in the HTML.

The plug-in developer can develop the broker component 108 and have the user install the broker component 108 on the local client computer. The broker component 108 receives a notification 204 from the input method component 102 when certain events occur in the input method component 102. Additionally, the broker component 108 can be invoked from the HTML page 202 by a URL protocol handler 206.

The data flow can be one way, from the web document in the web browser to the broker component to the input method component and finally, to the application. The broker component identifies which input method component instance to send the data using an identifier (also referred to as a ticket or token). The broker component knows the identifiers of input method components beforehand. The identifier can be pushed to the broker component from the input method component.

In one implementation, anytime an application obtains the focus of user interaction (or an application window moves to the foreground), the associated input method component for the application pushes its identifier (also referred to as event notification) to the broker component. Each input method component, attaching to any application, can push its identifier to the broker component at anytime. The broker component remembers the last registered identifier.

At anytime (when not synchronizing with an event pushed from the input method component to the broker component), the broker component can be called from the web document. When called, the broker component uses the last registered identifier to locate the associated input method component instance.

The web document is opened in the web browser beforehand, in whatever way possible, such as in response to selection from a favorite URL list, the input method component launches the web browser with a specific web document opened, etc. Once opened, the web document can serve all input method component instances. Thus, an input method component instance and web document are not necessarily in a 1-to-1 ratio. For example, a single instance of a software keyboard presented on desktop can be employed to work with any application desired or multiple applications.

In operation, when specific events occur, the input method component 102 sends the notification 204 (identifier) to the broker component 108. The broker component 108 may or may not invoke the HTML page 202 with these events as trigger. The events contain "ticket" information. The ticket information can be a handle of the application 104, COM (component object model) interface pointer of input method component 102, or other mechanisms the broker component 108 can use later to address the appropriate application (application 104) and/or the input method. In other words, the client computer can employ multiple different input method components and compatible broker components for specific purposes. Embodiments herein also describe scenarios of a single input method component with multiple broker components or a different suitable broker for each client application.

The HTML page 202 can be opened in a web browser and rendered by the browser. The developer can author any HTML page desired. The registered URL protocol handler 206 is called from the HTML page 202 with the appropriate parameters. In response, the broker component 108 is launched, and receives the parameters from the HTML page 202. Since the broker component 108 knows the ticket information, as sent along with the notification 204, the broker component 108 then communicates to the application 104 and the input method component 102 to add the additional input method functionality 208 resulting from the data of the HTML page 202 based on the ticket data received in the notification 206.

Once the broker component 108 is installed on the client computer, the developer can change or improve the input method component functionality by making the changes or improvements to code embedded in the HTML page 202 stored in the web server; that is, without any updates applied to the client computer. This provides a convenient and efficient architecture for updating and deploying the additional functionality automatically.

Note that the content provided to the application 104 is not limited to textual content. In the simplest form, with the simplest broker, the content can be a text string. In a more complex implementation, the broker component 108 can be designed to send metadata to a specific application when the broker component 108 is called from the HTML page 202, and the application 104 can insert complex objects (e.g., images) into itself in response to receiving the metadata. Essentially, it is based on the "contract" between the application 104 and the broker component 108. As previously indicated, multiple different broker components can be employed for specific purposes. Accordingly, many different data types can be added to the user system.

The use of HTML and web browsing technology already exist server-side. When using scripts in HTML in a web server and the user browses a web page, the HTML page is downloaded from the server to the client browser. The client browser runs the embedded script code to generate the data. Thus, the user does not need to install the client, but simply opens the HTML page in the server. The broker component can be installed on the client as native code. Program code previously downloaded in a web page document to the client browser can be automatically updated whenever the client downloads a corresponding updated web page document from the server.

The broker component defines data types. Once a data type is defined and the associated broker is installed, the broker will typically not need to be updated frequently. However, the data, of that data type can vary, and the generator (coded in the web page) of the data for that data type can change dynamically. Thus, the generator of the data can be easily changed since the generator is described by way of the markup language (e.g., HTML) and scripting language (e.g., java script), for example, as stored server-side. As previously indicated, the markup language is not restricted to HTML, but can be a suitable technology renderable in a browser.

One feature of the operating system that can be leveraged is the URL protocol handler. This technology can map a URL to an executable file (an "exe"). For example, the URL can have a format string that begins with "http:", "mailto:", or "ftp:", etc. The operating system can include a mechanism to pass this string, check the prefix of the string, and pass control to registered application executable. For example, if the URL starts with "http:", then the operating system will launch the browser executable. In another example, if the URL string begins with "mailto:", then the operating system launches a messaging program (e.g., e-mail).

The operating system can also include a feature that allows the broker component to extend this capability such that any prefix string can be registered and defined in association with any executable. This mechanism is employed to register a desired prefix string to the broker component.

In the HTML page, when the user launches this URL having the prefix, the operating system launches the registered broker executable. When the broker component is invoked, the broker component receives the entire URL string starting with the prefix, using the command line parameters. For example, if the HTML page includes some "<prefix>: xyz", where <prefix> can be "http", "ftp" mailto", etc., then the broker component receives the string of "<prefix>:xyz" in the command line parameters. If each HTML page wants to pass to the broker component a string "xyz", the HTML page includes the "<prefix>: xyz". Then the broker component is launched and receives the string "<prefix>:xyz" so that the broker component can extract string "xyz" by removing the known "<prefix>:" part.

When the broker component receives the string "xyz", the broker component and the application employ a protocol to send and receive the string. A very basic protocol that can be employed is WM_CHAR (for a Windows™ operating system) to send a character from one window to another window. If the broker component sends a WM_CHAR message to the application (e.g., WM_CHAR with the parameter x, followed by WM_CHAR with the parameter y, and WM_CHAR with the parameter z), then the application receives keyboard inputs of "x" followed by "y" followed by "z". Thus, all applications can handle this message on receive, and input "xyz" into the document that the application is handling. That is a basic broker model. Thus, many different broker components can be implemented and registered with different protocols, if desired.

In more advanced broker models, pictures, videos, images, sound, etc., can be pushed to the application. In this case, the user application and a broker can employ a predefined private protocol for optimum operation. In a more specific implementation, a custom broker can be developed for a specific client application.

There can be many applications on a client machine, and each application operates with an attached input method component, but the broker component is a single instance. The input method component signals the broker component to which application the broker component will send the message. When the user presses a key while in one of many possible applications, the input method component remembers the application in which the use was interacting, and sends the broker component the operating system handle for the application. Thereafter, the broker component uses the handle to send message. This is just one example, in that other methods can be employed to identify the application to which the message is sent.

The disclosed architecture finds particular applicability for languages (e.g., Japanese, Chinese, Arab, Latin, etc.), for example, that employ characters not normally presented on a suitable keyboard. In another implementation, the disclosed architecture can be employed to insert words and/or phrases by a single selection facilitated by an input device (e.g., mouse, keypad, etc.), that may not be obtainable via a keyboard.

Figure 3:
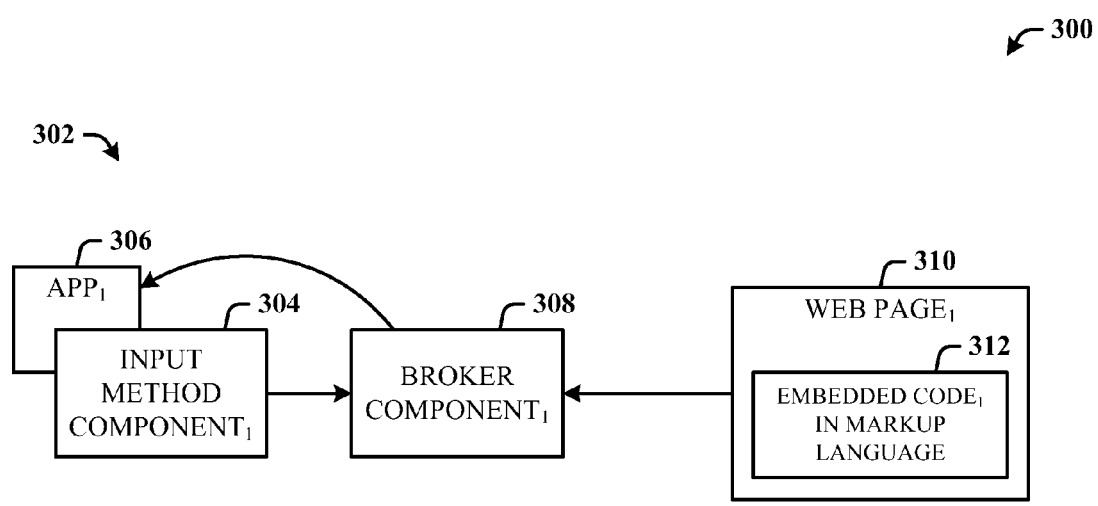
FIG. 3 illustrates a first client arrangement for adding additional functionality to an application.

FIG. 3 illustrates a first client arrangement 300 for adding additional functionality to an application. For example, in a first client arrangement 302, a first input method component 304 is being employed with a first application 306 for the utilization of baseline input method functionality provided by the first input method component 304. At any point in time, the first input method component 304 registers an identifier to a first broker component 308 via a notification to the first broker component 308. When initiated, a first web page 310 calls the first broker component 308. The first web page 310 includes embedded code 312 authored in a programming language (e.g., javascript) and embedded in a markup language such as HTML. Alternatively, other suitable web document languages can be employed.

A client browser downloads the first web page 310 from a network server (not shown) that stores web pages for many different purposes. The first web page 310 is opened in a client browser and the client browser runs the embedded code 312. Execution of the code 312 outputs data that is passed to the first broker component 308 via a protocol handler. The first broker component 308 then routes the data to the first application 306 for adding the first additional input method functionality 310 for insertion and use in the first application 306.

Figure 4:
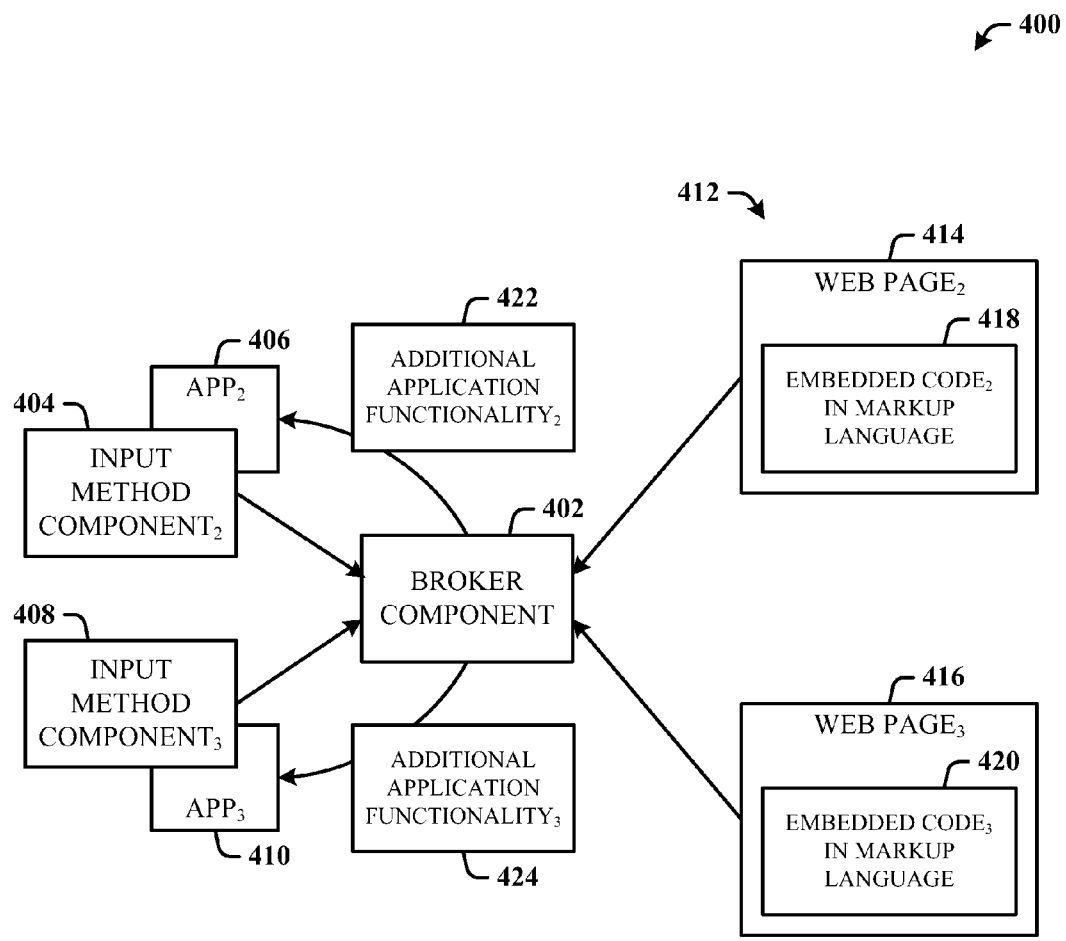
FIG. 4 illustrates a second client arrangement for adding additional functionality to applications.

FIG. 4 illustrates a second client arrangement 400 for adding additional functionality to applications. Here, a single broker component 402 supports data types for two applications and two corresponding input method components on a client machine. A second input method component 404 is associated with (e.g., attached) to a second application 406 and a third input method component 408 is associated with (e.g., attached) to a third application 410. The second input method component 404 and the third input method component 408 register (send notification) with the broker component 402, the last to register indicating the active application (e.g., in the foreground for user interaction).

Two web pages 412 are shown: a second web page 414 and a third web page 416. When the second web page 414 is downloaded and processed by the client browser, the browser runs embedded code 418 which causes a call to the broker component 402. Execution of the code 418 by the client browser generates data that is passed to the broker component 402, and which routes the data as additional application functionality based on the last registered input method component (e.g., the second input method component 404). For example, the data passed from the second web page 414 can be sent as the additional application functionality 422 to the second application 406.

Similarly, when the third web page 416 is downloaded and processed by the client browser, the browser runs embedded code 420 which causes a call to the broker component 402. Execution of the code 420 by the client browser generates data that is passed to the broker component 402, and which routes the data as additional application functionality based on the last registered input method component (e.g., the third input method component 408). For example, the data passed from the third web page 416 can be sent as the additional application functionality 424 to the third application 410.

It is within contemplation of the subject architecture that a broker component can be developed to provide support for a single input method component (e.g., the second input method component 404), and then two client applications. The applications (406 and 410) and associated input method components (404 and 408) are client-based applications, as well as the broker component 402. The web pages (414 and 416) are server-based for convenient and efficient update deployments.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
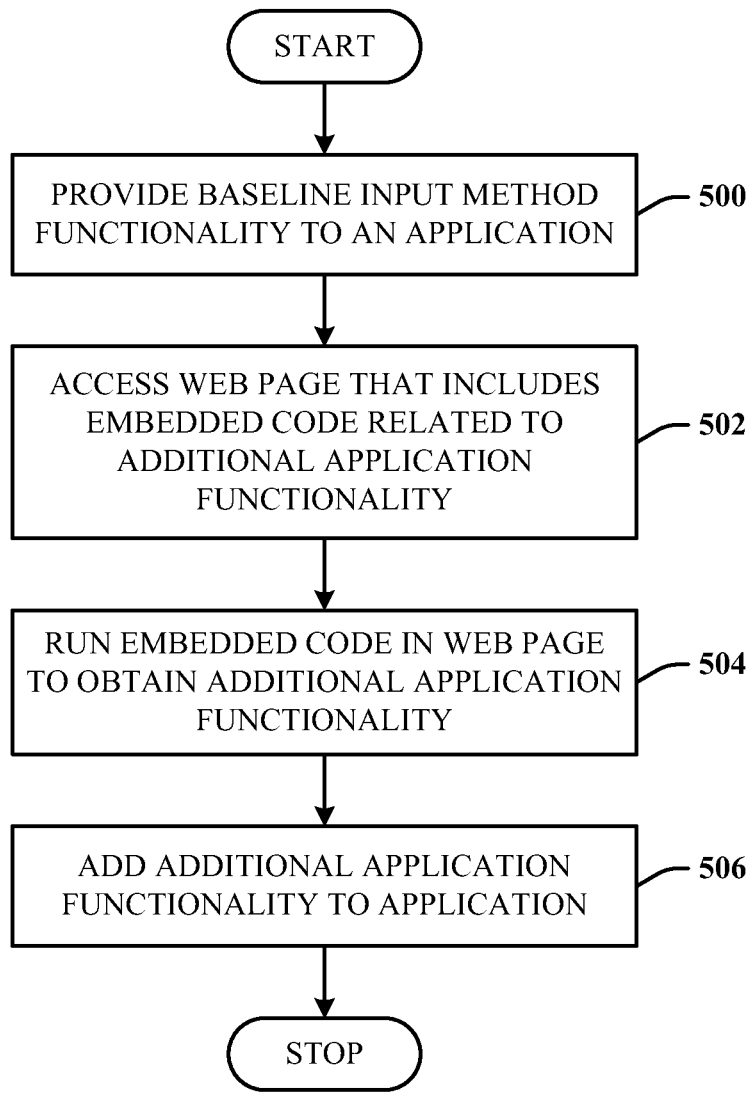
FIG. 5 illustrates a content method inputting content into an application via a browser.

FIG. 5 illustrates a content method inputting content into an application via a browser. At 500, baseline input method functionality is provided to an application. At 502, a web page is accessed that includes embedded code related to additional application functionality. At 504, the embedded code in the web page is run to obtain the additional application functionality. At 506, the additional application functionality is added to the application.

Figure 6:
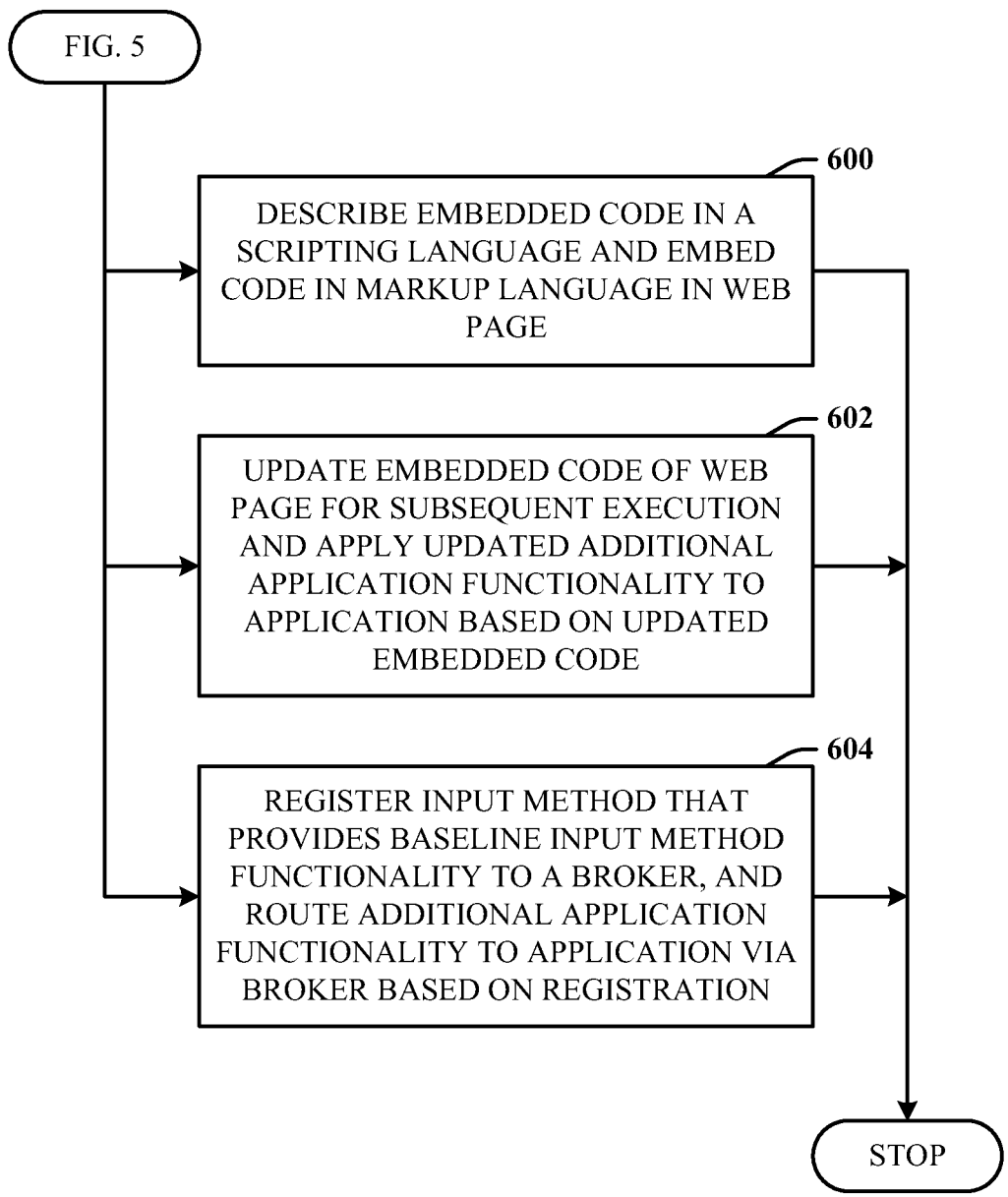
FIG. 6 illustrates additional aspects of the method of FIG. 5.

FIG. 6 illustrates additional aspects of the method of FIG. 5. At 600, the embedded code is described in a scripting language and embedded in a markup language in the web page. At 602, the embedded code of the web page is updated for subsequent execution and the updated additional application functionality applied to the application based on the updated embedded code. At 604, an input method is registered that provides the baseline input method functionality to a broker, and the additional application functionality is routed to the application via the broker based on the registration.

Figure 7:
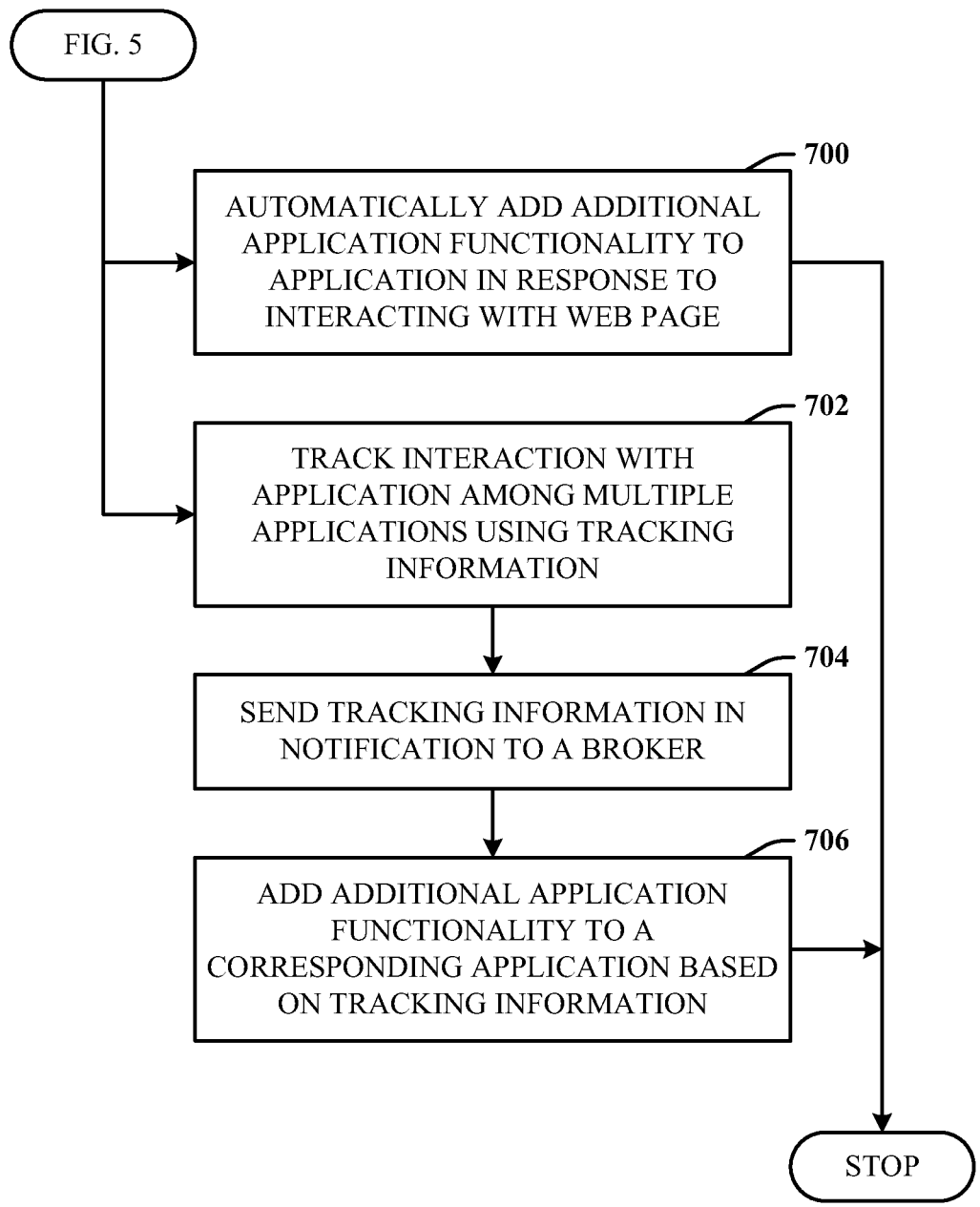
FIG. 7 illustrates additional aspects of the method of FIG. 5.

FIG. 7 illustrates additional aspects of the method of FIG. 5. At 700, the additional application functionality is automatically added to the application in response to interacting with the web page. At 702, interaction with the application is tracked among multiple applications using tracking information. At 704, the tracking information is sent in a notification to a broker component. At 706, the additional application functionality is added to a corresponding application based on the tracking information.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
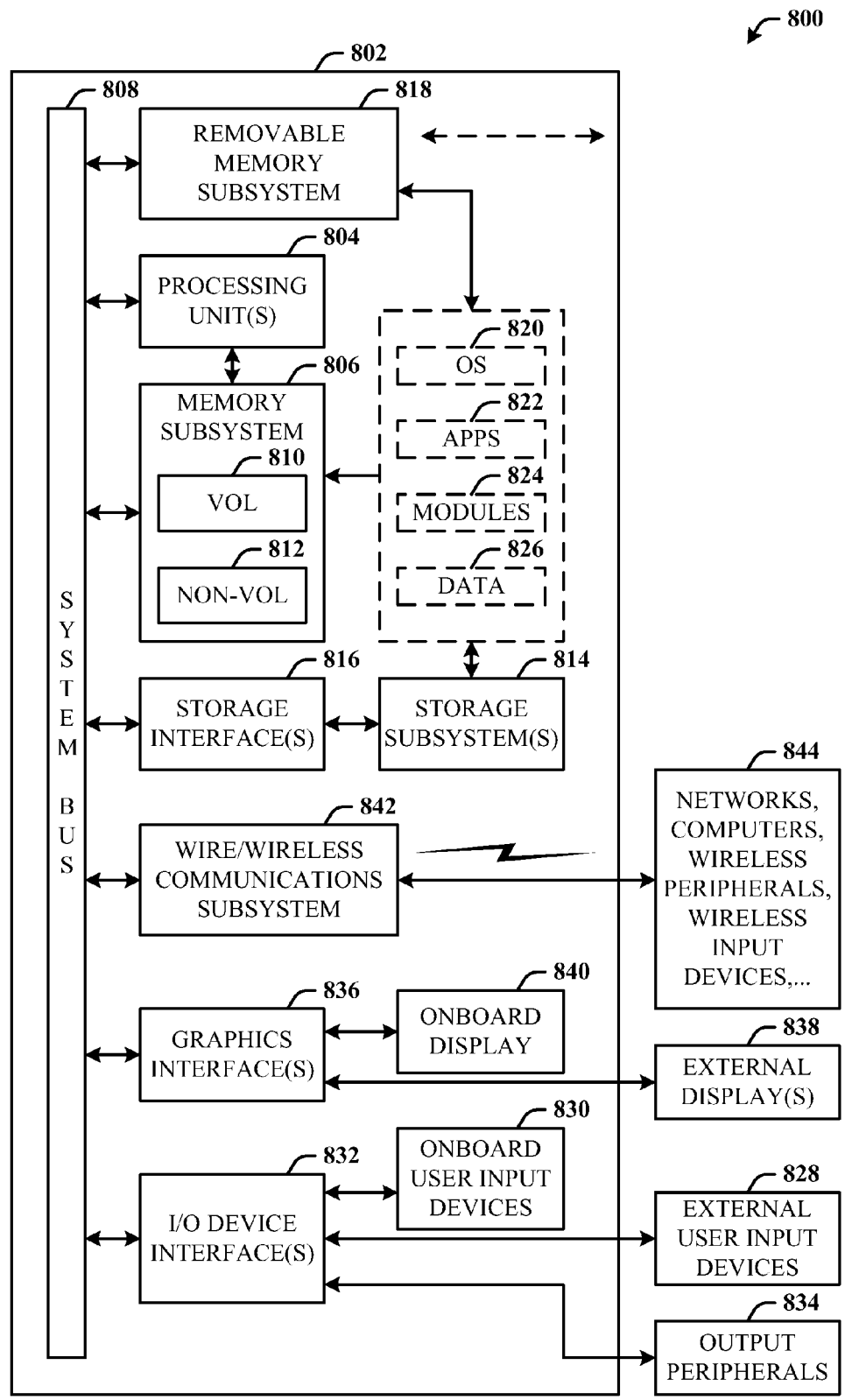
FIG. 8 illustrates a block diagram of a computing system that facilitates the input of content to an application via a browser in accordance with the disclosed architecture.

Referring now to FIG. 8, there is illustrated a block diagram of a computing system 700 that facilitates the input of content to an application via a browser in accordance with the disclosed architecture. In order to provide additional context for various aspects thereof, FIG. 8 and the following discussion are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the memory subsystem 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include the input method component 102, application 104, baseline input method functionality 106, the broker component 108, the additional functionality 114, data 110, browser 118, web document 112 and embedded code 116 of FIG. 1, the components and entities of FIG. 2, the components and entities of FIG. 4, and one or more acts described in the methods of FIGS. 5-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile media, removable and non-removable media. For the computer 802, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP) using logical connections via a wired/wireless communications subsystem 842 to one or more networks and/or other computers. The other computers can include workstations, servers, routers, personal computers, microprocessor-based entertainment appliance, a peer device or other common network node, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or has other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
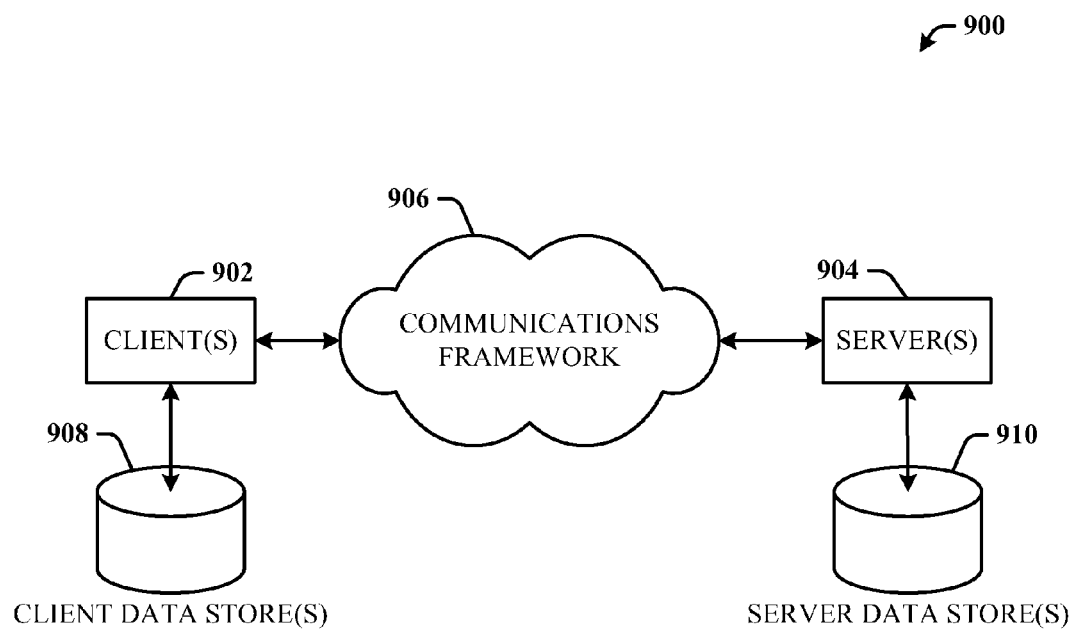
FIG. 9 illustrates a schematic block diagram of a computing environment that facilitates the input of content to an application via a browser.

Referring now to FIG. 9, there is illustrated a schematic block diagram of a computing environment 900 that facilitates the input of content to an application via a browser. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented content system, comprising:
a processor;
an input method component operable with the processor, the input method component comprising a software keyboard for providing baseline input method functionality to at least one application;
a first broker component operable with the processor and configured to receive data associated with a web document, the data adding additional functionality to a first application related to the input method component, the broker component being registered with a URL (uniform resource locator) prefix, the URL prefix being within the web document, the URL prefix being an extension to a set of native URL prefixes of an operating system in which the broker component operates, the operating system including the ability to extend the set of native URL prefixes by registering the URL prefix, registering the URL prefix including associating the URL prefix with a second application for the operating system; and
a second broker component operable with the processor and configured to receive data associated with a web document from the input method component, the data adding additional functionality to at least a third application related to the input method component.

2. The system of claim 1, wherein the web document is a web page that includes embedded code that when executed generates the data, the embedded code authored in a programming language and embedded in a markup language.

3. The system of claim 1, wherein the web document is stored on a web server, updated on the web server, and downloaded to a client browser on demand for utilization of updates by the application, updates to the web document being independent of any updates applied to a computing device associated with the processor.

4. The system of claim 1, wherein the web document facilitates controlled entry of the data into the application via a web document control.

5. The system of claim 1, wherein the first broker component is invoked from the web document using a URL (uniform resource locator) protocol handler.

6. The system of claim 1, wherein the input method component sends an identifier in a notification to the first broker component that indicates to the first broker component an associated input method component or application to which the data will be routed.

7. The system of claim 1, wherein the first broker component receives multiple identifiers associated with respective input method components, the first broker component registers the identifiers and routes the data to an application associated with an input method component of a last registered identifier.

8. The system of claim 1, wherein the additional input method functionality includes at least one of text or complex objects.

9. A computing apparatus comprising:
one or computer readable storage media;
a processor operatively coupled with the one more or more computer readable storage media; and
program instructions stored on the one or more computer readable storage media, the program instructions comprising:
an input method component operable with the processor, the input method component comprising a software keyboard for providing baseline input method functionality to at least one application;
a first broker component operable with the processor and configured to receive data associated with a web document, the data adding additional functionality to a first application related to the input method component, the broker component being registered with a URL (uniform resource locator) prefix, the URL prefix being within the web document, the URL prefix being an extension to a set of native URL prefixes of an operating system in which the broker component operates, the operating system including the ability to extend the set of native URL prefixes by registering the URL prefix, registering the URL prefix including associating the URL prefix with a second application for the operating system; and a second broker component operable with the processor and configured to receive data associated with a web document from the input method component, the data adding additional functionality to at least a third application related to the input method component.

10. The computing apparatus of claim 9, wherein the web document is a web page that includes embedded code that when executed generates the data, the embedded code authored in a programming language and embedded in a markup language.

11. The computing apparatus of claim 9, wherein the web document is stored on a web server, updated on the web server, and downloaded to a client browser on demand for utilization of updates by the application, updates to the web document being independent of any updates applied to a computing device associated with the processor.

12. The computing apparatus of claim 9, wherein the web document facilitates controlled entry of the data into the application via a web document control.

13. The computing apparatus of claim 9, wherein the first broker component is invoked from the web document using a URL (uniform resource locator) protocol handler.

14. The computing apparatus of claim 9, wherein the input method component sends an identifier in a notification to the first broker component that indicates to the first broker component an associated input method component or application to which the data will be routed.

15. The computing apparatus of claim 9, wherein the first broker component receives multiple identifiers associated with respective input method components, the first broker component registers the identifiers and routes the data to an application associated with an input method component of a last registered identifier.

16. The computing apparatus of claim 9, wherein the additional input method functionality includes at least one of text or complex objects.

* * * * *